(12) United States Patent
Toya

(10) Patent No.: US 11,480,466 B2
(45) Date of Patent: Oct. 25, 2022

(54) MEASUREMENT DEVICE AND MEASUREMENT METHOD

(71) Applicant: SEIKO EPSON CORPORATION, Tokyo (JP)

(72) Inventor: Takashi Toya, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/134,798

(22) Filed: Dec. 28, 2020

(65) Prior Publication Data

US 2021/0190587 A1 Jun. 24, 2021

(30) Foreign Application Priority Data

Dec. 24, 2019 (JP) .............................. JP2019-232798

(51) Int. Cl.
*G01J 3/02* (2006.01)
*G01J 3/06* (2006.01)
*G01J 3/12* (2006.01)

(52) U.S. Cl.
CPC .......... *G01J 3/0229* (2013.01); *G01J 3/0208* (2013.01); *G01J 3/0291* (2013.01); *G01J 2003/066* (2013.01); *G01J 2003/1226* (2013.01)

(58) Field of Classification Search
CPC ......... G01J 2003/066; G01J 2003/1226; G01J 3/0202; G01J 3/0208; G01J 3/0229; G01J 3/0291; G01J 3/10; G01J 3/26; G01J 3/46
See application file for complete search history.

(56) References Cited

U.S. PATENT DOCUMENTS

| 2016/0258813 A1 | 9/2016 | Kuri |
| 2016/0286054 A1 | 9/2016 | Kuri |
| 2016/0379095 A1 | 12/2016 | Nozawa |

FOREIGN PATENT DOCUMENTS

JP 2016166865 A 9/2016

*Primary Examiner* — Hina F Ayub
(74) *Attorney, Agent, or Firm* — Chip Law Group

(57) ABSTRACT

Provided is a measurement device including a spectroscope, a movement mechanism configured to relatively move the spectroscope in one direction, and one or more processors configured to determine whether a measurement position measured by the spectroscope is moved into a color patch, in which the one or more processors cause the spectroscope to execute measurement processing for a plurality of wavelengths set in advance while relatively moving the spectroscope in the one direction, and when at least one of amounts of variation of measured values with respect to each of the plurality of wavelengths obtained in the measurement processing exceeds a first threshold value and then each of the amounts of variation of the measured values of the plurality of wavelengths falls below a second threshold value which is less than or equal to the first threshold value, determine that the measurement position is moved into the color patch.

6 Claims, 10 Drawing Sheets

MEASUREMENT DEVICE AND MEASUREMENT METHOD

The present application is based on, and claims priority from JP Application Serial Number 2019-232798, filed Dec. 24, 2019, the disclosure of which is hereby incorporated by reference herein in its entirety.

BACKGROUND

Technical Field

The present disclosure relates to a measurement device and a measurement method.

Related Art

In the related art, as a printing apparatus that forms an image on a medium, a printing apparatus is known that performs calibration processing such that a color of input image data and a color of an image printed by a print head match each other. (for example, see JP-A-2017-111059).

The printing apparatus described in JP-A-2017-111059 includes a transporting mechanism for transporting a medium in the Y direction and a carriage which is movable in the X direction that is orthogonal to the Y direction, and a printing portion and a spectroscope are mounted on the carriage. As calibration processing, the printing apparatus first forms a start line and color patches arranged in the X direction on the medium. Thereafter, the printing apparatus moves the carriage in the X direction from a home position while causing the spectroscope to execute spectroscopic measurement processing with a predetermined wavelength which is set in advance. With such a configuration, when the spectroscope crosses the start line, a signal value output from the spectroscope varies by a threshold value or more, so that it can be detected that the spectroscope has crossed a position of the start line. Further, JP-A-2017-111059 discloses that when the spectroscope straddles color patches which are adjacent to each other, the signal value output from the spectroscope varies linearly, and it is detected that the spectroscope straddles the color patches at the timing when the signal value becomes constant.

However, a color difference between the color patches arranged adjacent to each other may be small. In a measurement method described in JP-A-2017-111059, in such a case, even when the spectroscope is moved across the color patches, the variation in the signal value is small, and it is difficult to determine the timing when the signal value becomes constant. Therefore, a usage scene is specified, for example, it is necessary to form a color chart in which adjacent color patches do not become similar colors. Further, although the above-mentioned JP-A-2017-111059 relates to a printing apparatus, the same problem is also encountered in a measurement device that is not provided with a printing mechanism and only measures color patches.

SUMMARY

A measurement device according to a first aspect of the present disclosure includes: a spectroscope configured to measure light with a predetermined spectral wavelength of incident light from a measurement target and change the spectral wavelength; a movement mechanism configured to relatively move the spectroscope in one direction with respect to the measurement target; and one or more processors configured to determine, when the measurement target is a color patch and the spectroscope is relatively moved in the one direction, whether or not a measurement position measured by the spectroscope is moved into the color patch, in which the one or more processors cause the spectroscope to execute measurement processing for a plurality of wavelengths set in advance while relatively moving the spectroscope in the one direction, and when at least one of amounts of variation of measured values with respect to each of the plurality of wavelengths obtained in the measurement processing exceeds a first threshold value and then each of the amounts of variation of the measured values of the plurality of wavelengths falls below a second threshold value which is less than or equal to the first threshold value, determine that the measurement position is moved into the color patch.

A measurement method of a measurement device according to a second aspect of the present disclosure includes a spectroscope configured to measure light with a predetermined spectral wavelength of incident light from a measurement target and change the spectral wavelength, and a movement mechanism configured to relatively move the spectroscope in one direction with respect to the measurement target, the method including: when the measurement target is a color patch, causing the spectroscope to execute measurement processing for a plurality of wavelengths set in advance while relatively moving the spectroscope in the one direction, and when at least one of amounts of variation of measured values with respect to each of the plurality of wavelengths obtained in the measurement processing exceeds a first threshold value and then each of the amounts of variation of the measured values of the plurality of wavelengths falls below a second threshold value which is less than or equal to the first threshold value, determining that a measurement position measured by the spectroscope is moved into the color patch.

DESCRIPTION OF EXEMPLARY EMBODIMENTS

Hereinafter, a first embodiment will be described below. In the present embodiment, a printer 10 including a measurement device will be described below.

Schematic Configuration of Printer 10

Figure 1:
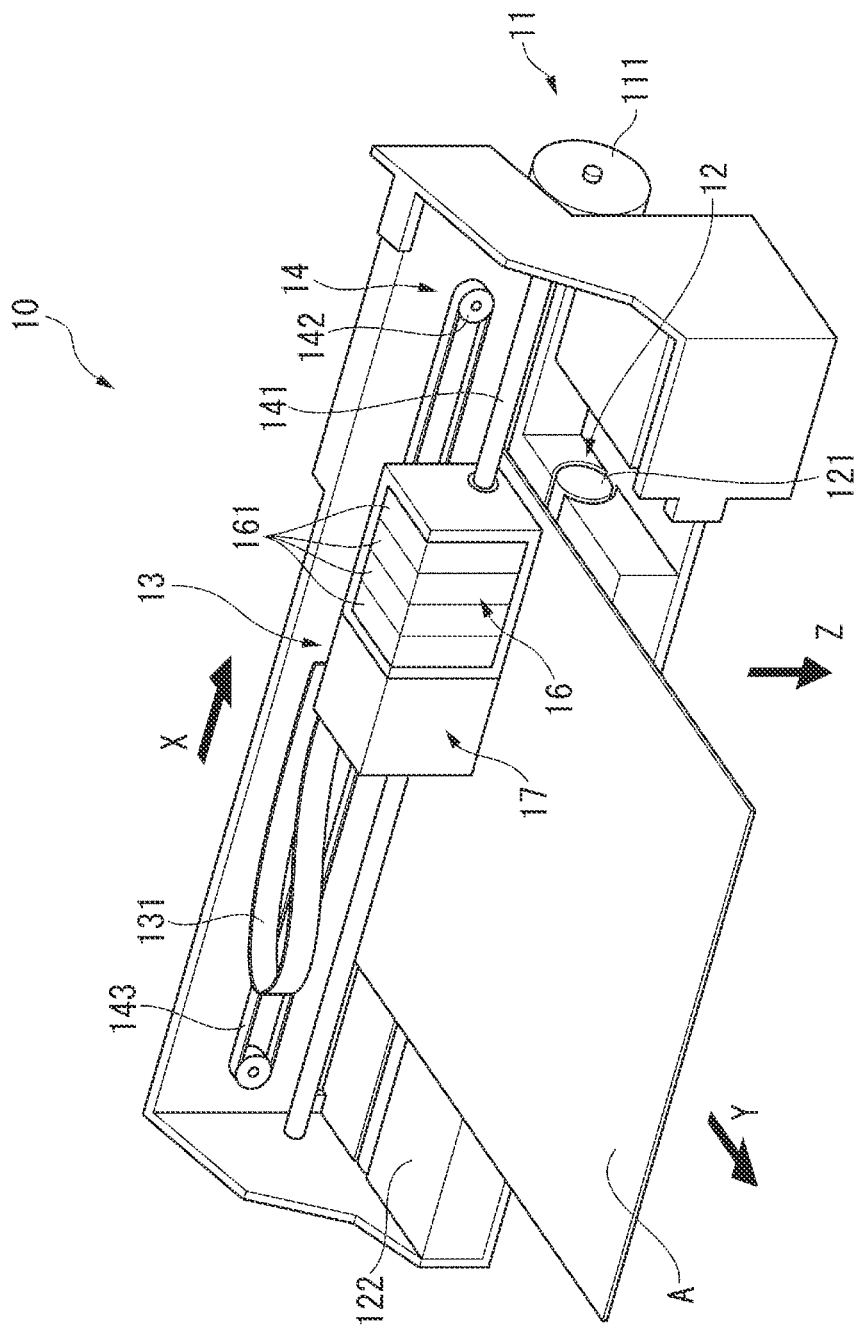
FIG. 1 is an external view illustrating a schematic configuration of a printer of a first embodiment of the present disclosure.
Figure 2:
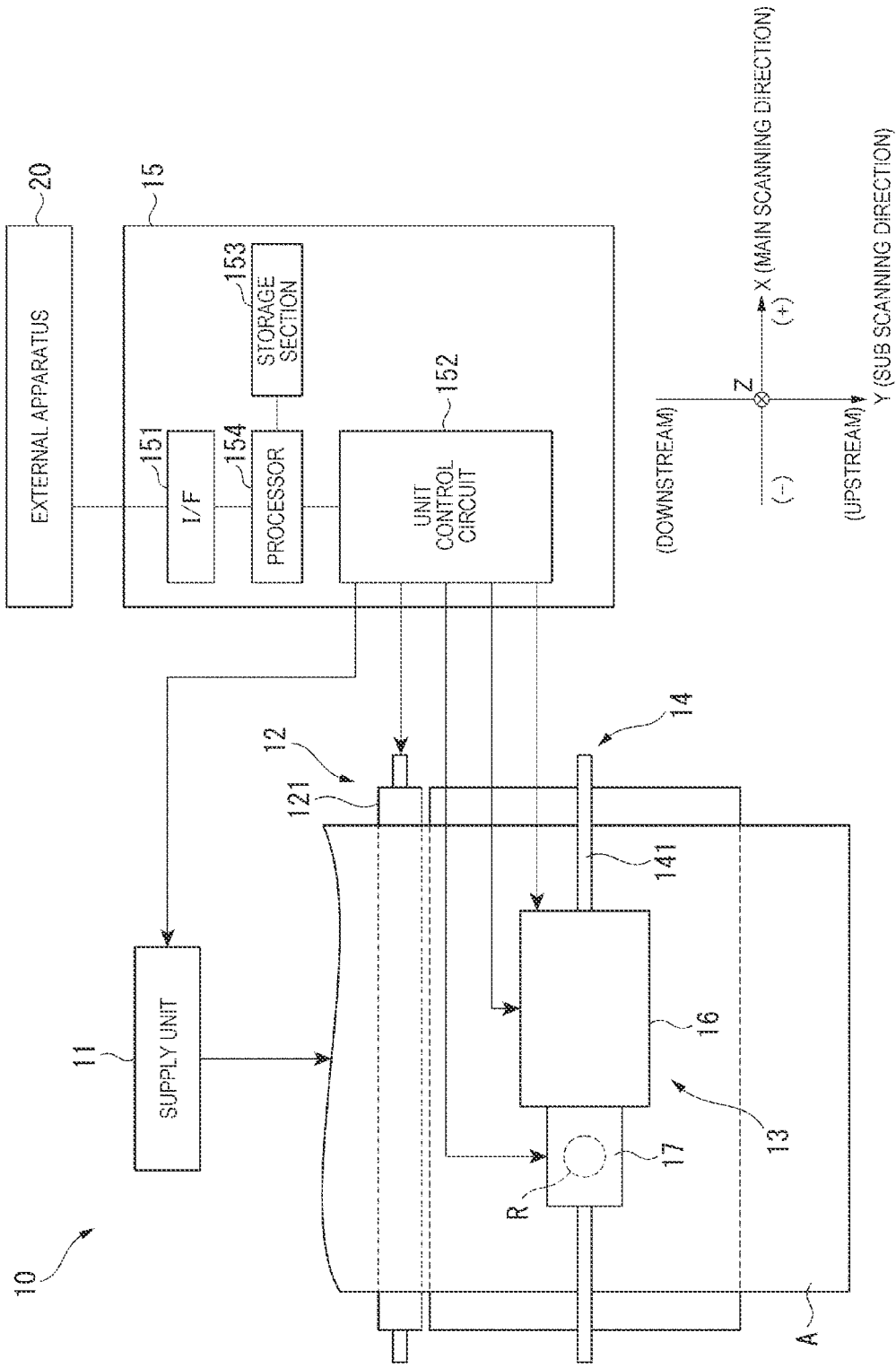
FIG. 2 is a block diagram illustrating a schematic configuration of the printer of the present embodiment.

FIG. 1 is a diagram illustrating a configuration example of an appearance of a printer 10 of the present embodiment. FIG. 2 is a block diagram illustrating a schematic configuration of the printer 10 of the present embodiment. As illustrated in FIG. 1, the printer 10 includes a supply unit 11, a transport unit 12, a carriage 13, a carriage moving unit 14, and a control unit 15 (see FIG. 2). The printer 10 controls each of the units 11, 12, and 14, and the carriage 13 based on print data input from an external apparatus 20 such as a personal computer, for example, and prints an image on a medium A. Further, the printer 10 of the present embodiment forms a color patch 31 for a color measurement (see FIG. 7 and the like) at a predetermined position on the medium A based on data for calibration set in advance, and performs a spectroscopic measurement on the color patch 31. Thereby, the printer 10 compares the measured value, which is the actual measured value with respect to the color patch 31, with the data for calibration to determine whether or not a printed color has color shift, and when there is a color shift, color correction is performed based on the actual measured value. Hereinafter, each configuration of the printer 10 will be specifically described.

The supply unit 11 is a unit for supplying a medium A, which is an image forming target, to an image forming position. The supply unit 11 includes, for example, a roll body 111 around which the medium A is wound, a roll drive motor (not illustrated), a roll drive wheel train (not illustrated), and the like. Based on an instruction from the control unit 15, the roll drive motor is rotationally driven, and a rotational force of the roll drive motor is transmitted to the roll body 111 via the roll drive wheel train. Thereby, the roll body 111 rotates, and the medium A wound around the roll body 111 is supplied to the +Y side. In the present embodiment, an example in which a sheet wound around the roll body 111 is supplied is illustrated, but the present disclosure is not limited to this. For example, the media A may be supplied by any supply methods, such as supplying the media A, such as sheets stacked on a tray or the like, one by one by a roller or the like. Further, as the medium A of the present embodiment, a film, a cloth, or the like can be used in addition to a sheet such as a printing paper.

The transport unit 12 transports the medium A supplied from the supply unit 11 to the +Y side. The transport unit 12 is configured to include a transport roller 121, a driven roller (not illustrated), which is disposed with the transport roller 121 and the medium A interposed therebetween and is driven by the transport roller 121, and a platen 122. When a driving force from a transport motor (not illustrated) is transmitted and the transport motor is driven by a control of the control unit 15, the transport roller 121 is rotationally driven by the rotational force of the transport roller 121 and transports the medium A along the Y direction in a state where the medium A is interposed between the driven roller and the transport roller 121. Further, a platen 122 facing the carriage 13 is provided on the +Y side of the transport roller 121.

The carriage 13 corresponds to a spectroscopic measurement portion according to the present disclosure, and includes a printing portion 16 for printing an image on the medium A and a spectroscope 17 for performing a spectroscopic measurement of a predetermined measurement region R (see FIG. 2) on the medium A. The measurement region R corresponds to a measurement position according to the present disclosure. In the present embodiment, an example is illustrated in which the carriage 13, which is a spectroscopic measurement portion, includes one spectroscope. The carriage 13 is provided so as to be movable by a carriage moving unit 14 along an X direction that intersects the Y direction. The X direction corresponds to a first direction according to the present disclosure. The carriage 13 is coupled to the control unit 15 by a flexible circuit 131. Based on an instruction from the control unit 15, the carriage 13 executes printing processing by the printing portion 16 (image forming processing for the medium A) and spectroscopic measurement processing by the spectroscope 17. The detailed configurations of the printing portion 16 and the spectroscope 17 mounted on the carriage 13 will be described later.

The carriage moving unit 14 constitutes a movement mechanism according to the present disclosure, and causes the carriage 13 to reciprocate along the X direction based on an instruction from the control unit 15. The carriage moving unit 14 is configured to include, for example, a carriage guide shaft 141, a carriage motor 142, and a timing belt 143. The carriage guide shaft 141 is disposed along the X direction, and both end portions thereof are fixed to a housing of the printer 10. The carriage motor 142 drives the timing belt 143. The timing belt 143 is supported substantially parallel to the carriage guide shaft 141, and a part of the carriage 13 is fixed. When the carriage motor 142 is driven based on the instruction from the control unit 15, the timing belt 143 runs forward and backward, and the carriage 13 fixed to the timing belt 143 is guided by the carriage guide shaft 141 to reciprocate.

Next, the configurations of the printing portion 16 and the spectroscope 17 mounted on the carriage 13 will be described.

Configuration of Printing Portion 16

The printing portion 16 is disposed so as to face the medium A, discharges ink individually onto the medium A, and forms an image on the medium A. An ink cartridge 161 that supports a plurality of colors of ink is attached to the printing portion 16 in an attachable and detachable manner, and ink is supplied from each ink cartridge 161 to an ink tank (not illustrated) via a tube (not illustrated). Further, nozzles (not illustrated) that discharge ink droplets are provided on a lower surface of the printing portion 16 (a position facing the medium A) in correspondence with each color. For example, piezoelectric elements are disposed in these nozzles and by driving the piezoelectric elements, the ink droplets supplied from the ink tank are discharged and land on the medium A to form dots.

Configuration of Spectroscope 17

Figure 3:
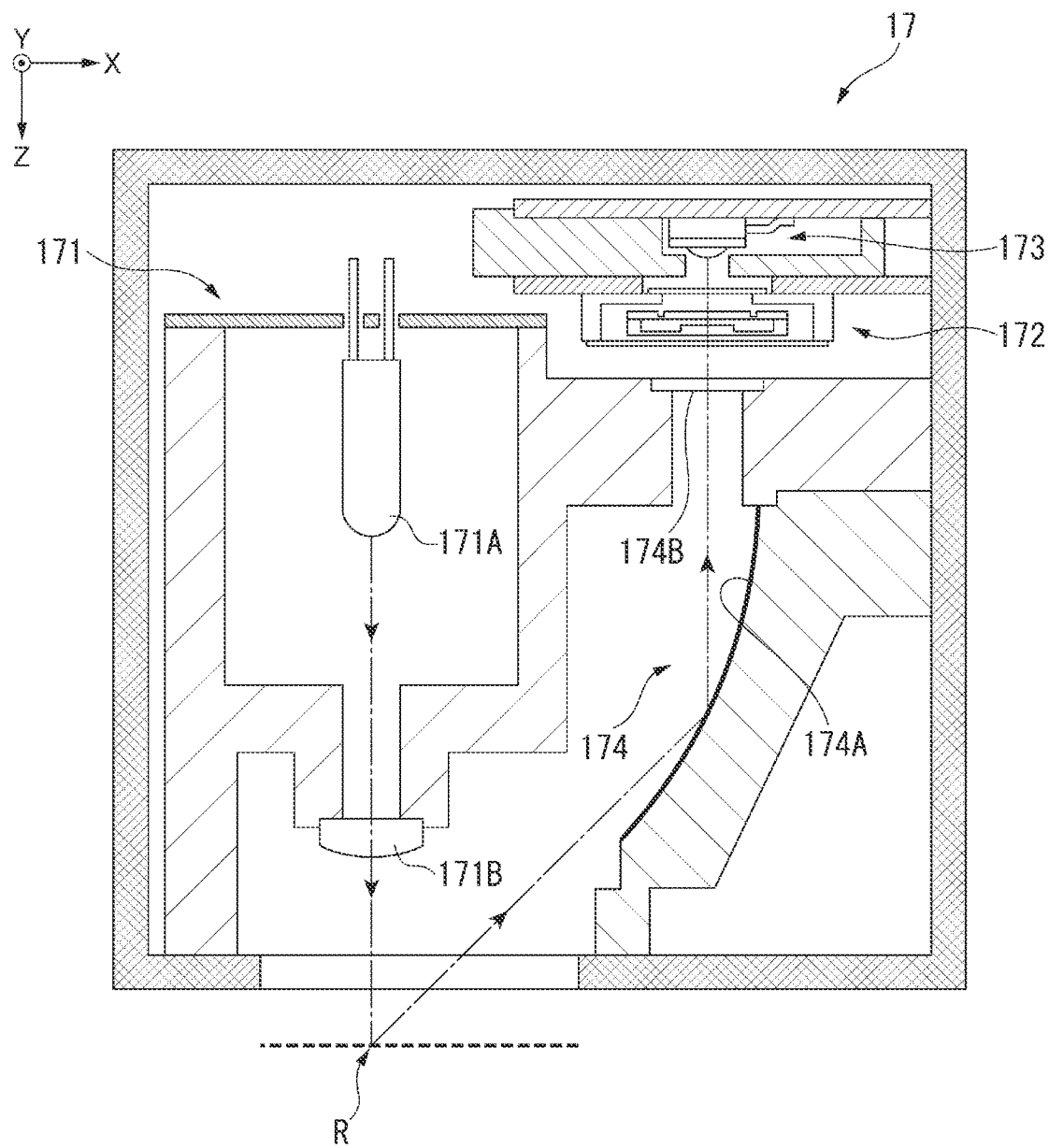
FIG. 3 is a cross-sectional view illustrating a schematic configuration of a spectroscope of the present embodiment.

FIG. 3 is a cross-sectional view illustrating a schematic configuration of the spectroscope 17. As illustrated in FIG. 3, the spectroscope 17 includes a light source portion 171, an optical filter device 172, a light receiving portion 173, and a light guiding portion 174. The spectroscope 17 irradiates the medium A with an illumination light from the light source portion 171 and causes a light component reflected by the medium A to enter the optical filter device 172 by the light guiding portion 174. The optical filter device 172 emits (transmits) light with a predetermined wavelength from the reflected light and causes the light receiving portion 173 to receive the light. Further, the optical filter device 172 can select a transmission wavelength based on the control of the control unit 15 and enables the spectroscopic measurement of the measurement region R on the medium A by measuring the amount of light with each wavelength in visible light.

Configuration of Light Source Portion 171

The light source portion 171 includes a light source 171A and a condensing portion 171B. The light source portion 171 irradiates the measurement region R on the medium A with the light emitted from the light source 171A in a normal direction with respect to a surface of the medium A. As a light source 171A, a light source in which a light emitting spectrum in a visible light range has a plurality of peak wavelengths is desirable, and more desirably it is a light source in which each of a plurality of peak wavelengths appears to be separated by 80 nm or more. As such a light source, for example, a white LED in which an ultraviolet LED and an RGB phosphor are combined can be exemplified, and in addition, a light source such as a fluorescent lamp may be used. The condensing portion 171B is constituted by, for example, a condensing lens or the like, and the light from the light source 171A is condensed on the measurement region R. Although only one lens (condensing lens) is displayed in the condensing portion 171B in FIG. 3, it may be configured by combining a plurality of lenses. In the present embodiment, an example in which the light source portion 171 is included in the spectroscope 17 is illustrated, but the present disclosure is not limited to this. For example, the light source portion 171 may be mounted on the carriage 13 separately from the spectroscope 17.

Configuration of Optical Filter Device 172

Figure 4:
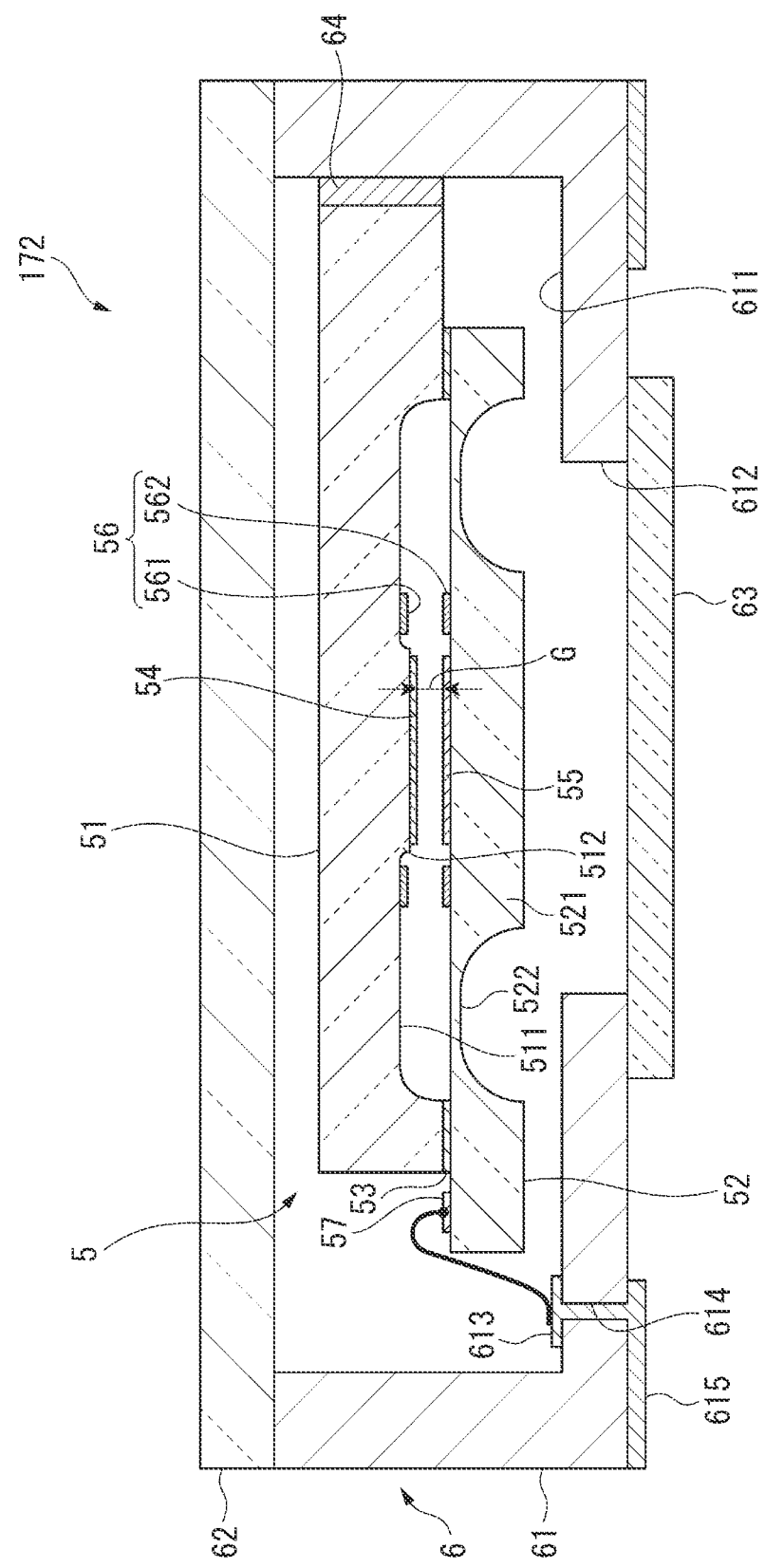
FIG. 4 is a cross-sectional view illustrating a schematic configuration of an optical filter device of the present embodiment.

FIG. 4 is a cross-sectional view illustrating a schematic configuration of the optical filter device 172. The optical filter device 172 includes a housing 6 and a variable wavelength interference filter 5 accommodated inside the housing 6.

The variable wavelength interference filter 5 is a variable wavelength type Fabry-Perot etalon element and includes a first substrate 51 and a second substrate 52 which have transmittance as illustrated in FIG. 4. The first substrate 51 and the second substrate 52 are integrally configured by being bonded to each other with the bonding film 53. The first substrate 51 includes a first groove portion 511 formed by etching and a second groove portion 512 having a shallower groove depth than the first groove portion 511. The first groove portion 511 is provided with a first electrode 561, and the second groove portion 512 is provided with a first reflective film 54. The first electrode 561 is formed, for example, in a ring shape surrounding the second groove portion 512, and faces a second electrode 562 provided on the second substrate 52. The first reflective film 54 is constituted by, for example, a metal film such as Ag, an alloy film such as Ag alloy, a dielectric multilayer film in which a high refractive layer and a low refractive layer are laminated, or a laminated body in which a metal film (alloy film) and a dielectric multilayer film are laminated.

The second substrate 52 includes a movable portion 521 and a diaphragm portion 522 which is provided outside the movable portion 521 and holds the movable portion 521. The movable portion 521 is formed to have a thickness dimension larger than that of the diaphragm portion 522. The movable portion 521 is formed to have a diameter dimension larger than a diameter dimension of the outer peripheral of the first electrode 561, and the second electrode 562 and a second reflective film 55 are provided on a surface of the movable portion 521 facing the first substrate 51. The second electrode 562 is provided at a position facing the first electrode 561. The second reflective film 55 is disposed at a position facing the first reflective film 54 with a gap G interposed therebetween. As the second reflective film 55, a reflective film having the same configuration as the first reflective film 54 described above can be used.

The diaphragm portion 522 is a diaphragm that surrounds the periphery of the movable portion 521 and is formed to have a smaller thickness dimension than that of the movable portion 521. Such a diaphragm portion 522 is more flexible than the movable portion 521, and it is possible to displace the movable portion 521 to the first substrate 51 side by a slight electrostatic attractive force. This makes it possible to change a gap dimension of the gap G in a state where the parallelism of the first reflective film 54 and the second reflective film 55 is maintained. In the present embodiment, the diaphragm portion 522 having a diaphragm shape is exemplified, but the present disclosure is not limited to this, and for example, a configuration may be adopted in which holding portions having a beam shape arranged at equal angular intervals centered at the plane center point are provided. Further, a plurality of electrode pads 57 that are individually coupled to the first electrode 561 and the second electrode 562 are provided on an outer peripheral portion of the second substrate 52 (a region that does not face the first substrate 51).

As illustrated in FIG. 4, the housing 6 includes a base 61 and a glass substrate 62. For the base 61 and the glass substrate 62, for example, a low melting point glass bonding using a glass frit (low melting point glass), an adhesion with an epoxy resin, or the like can be used, whereby an accommodation space is formed inside, and the variable wavelength interference filter 5 is accommodated in the accommodation space.

The base 61 is formed by laminating ceramics on a thin plate, for example, and has a recess portion 611 in which the variable wavelength interference filter 5 can be accommodated. The variable wavelength interference filter 5 is fixed by a fixing member 64 to, for example, a side surface of the recess portion 611 of the base 61. A light passage hole 612 is provided on a bottom surface of the recess portion 611 of the base 61. The light passage hole 612 is provided so as to include a region overlapping the reflective films 54 and 55 of the variable wavelength interference filter 5. Further, a cover glass 63 that covers the light passage hole 612 is bonded to a surface of the base 61 opposite to the glass substrate 62.

Further, the base 61 is provided with an inner side terminal portion 613 coupled to an electrode pad 57 of the variable wavelength interference filter 5, and an inner side terminal portion 613 is coupled to an outer side terminal portion 615 provided on an outer side of the base 61 via a conduction hole 614. The outer side terminal portion 615 is electrically coupled to the control unit 15.

Configuration of Light Receiving Portion 173 and Light Guiding Portion 174

Returning to FIG. 3, the light receiving portion 173 is disposed on an optical axis of the variable wavelength interference filter 5 and receives the light transmitted through the variable wavelength interference filter 5. The light receiving portion 173 outputs a detection signal according to the amount of received light based on the control of the control unit 15. After signal processing is performed by an IV converter, an amplifier, and an AD converter, the detection signal output from the light receiving portion 173 is sampled at a predetermined sampling frequency with a sample and hold circuit (not illustrated). A signal value of the sampled detection signal is output to the control unit 15. The light guiding portion 174 includes a reflecting mirror 174A and a bandpass filter 174B. In the measurement region R, the light guiding portion 174 reflects the light which is reflected at 45° with respect to the surface of the medium A onto the optical axis of the variable wavelength interference filter 5 by the reflecting mirror 174A. The bandpass filter 174B transmits, for example, the light in the visible light range (for example, 380 nm to 720 nm) and cuts the ultraviolet light and infrared light. Thereby, the light in the visible light range is incident on the variable wavelength interference filter 5, and the light receiving portion 173 receives the light with the wavelength selected by the variable wavelength interference filter 5 in the visible light range.

Configuration of Control Unit

The control unit 15 is a control portion according to the present disclosure, and configured to include an I/F 151, a unit control circuit 152, a storage section 153, and a processor 154, as illustrated in FIG. 2. The I/F 151 inputs print data input from an external apparatus 20 to the processor 154. The unit control circuit 152 includes a control circuit that controls each of the supply unit 11, the transport unit 12, the printing portion 16, the light source 171A, the variable wavelength interference filter 5, the light receiving portion 173, and the carriage moving unit 14, and controls an operation of each unit based on an instruction signal from the processor 154. The control circuit of each unit may be provided separately from the control unit 15 and coupled to the control unit 15.

A storage section 153 is, for example, an information storage device such as a semiconductor memory or a hard disk, and stores various programs or various data for controlling the operation of the printer 10. Examples of various data include, for example, V-λ data indicating a wavelength of the light transmitted through the variable wavelength interference filter 5 with respect to a voltage applied to an electrostatic actuator 56 when controlling the variable wavelength interference filter 5, print profile data that stores the discharge amount of each ink with respect to the color data included as print data, or the like. Further, the light emission characteristic (light emitting spectrum) of the light source 171A for each wavelength, the light reception characteristic (light reception sensitivity characteristic) of the light receiving portion 173 for each wavelength, and the like may be stored.

Figure 5:
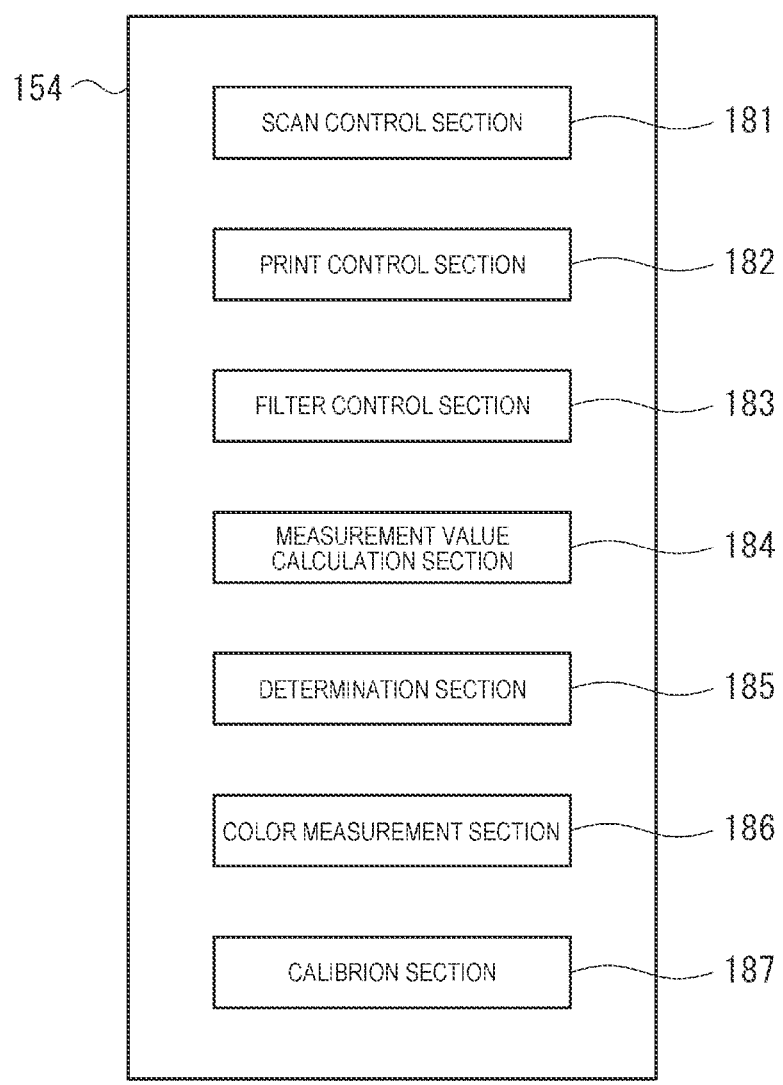
FIG. 5 is a block diagram illustrating a functional configuration of a control unit in the present embodiment.

FIG. 5 is a block diagram illustrating a functional configuration of a CPU included in the control unit 15 of the printer 10. The processor 154 reads out and executes the various programs stored in the storage section 153, thereby as illustrated in FIG. 5, functions as a scan control section 181, a print control section 182, a filter control section 183, a measurement value calculation section 184, a determination section 185, a color measurement section 186, and a calibration section 187, or the like.

The scan control section 181 outputs an instruction signal for driving the supply unit 11, the transport unit 12, and the carriage moving unit 14 to the unit control circuit 152. Thereby, the unit control circuit 152 drives the roll drive motor of the supply unit 11 to supply the medium A to the transport unit 12. Further, the unit control circuit 152 drives the transport motor of the transport unit 12 to transport the predetermined region in the medium A to a position facing the carriage 13 of the platen 122 along the Y direction. The unit control circuit 152 drives the carriage motor 142 of the carriage moving unit 14 to move the carriage 13 along the X direction.

The print control section 182 outputs the instruction signal for controlling the printing portion 16 to the unit control circuit 152 based on the print data input from the external apparatus 20, for example. Further, in the present embodiment, the print control section 182 forms the color patch 31 on the medium A based on the data for calibration indicating that the color patch 31 of a predetermined color, which is set in advance, is formed at a predetermined position. The data for calibration may be stored in the storage section 153 or may be input from the external apparatus 20. A detailed description of the color patch 31 will be described later. When the instruction signal is output from the print control section 182 to the unit control circuit 152, the unit control circuit 152 outputs a print control signal to the printing portion 16 and drives the Piezoelectric elements which are provided in the nozzles to discharge the ink onto the medium A. When printing is performed, the carriage 13 is moved along the X direction, a dot forming operation for forming dots by discharging the ink from the printing portion 16 and a transport operation for transporting the medium A in the Y direction are repeated alternately during the movement, and an image composed of a plurality of dots is printed on the medium A.

The filter control section 183 reads out the drive voltage to the electrostatic actuator 56 with respect to the wavelength of the light which is transmitted through the variable wavelength interference filter 5, from the V-λ data in the storage section 153, and outputs the instruction signal to the unit control circuit 152. Thereby, in the unit control circuit 152, a drive voltage in which the variable wavelength interference filter 5 is instructed is applied, and the light with the desired transmission wavelength is transmitted from the variable wavelength interference filter 5. Specifically, when the determination section 185 determines that the entire measurement region R is moved into the color patch 31, the filter control section 183 executes the spectroscopic measurement processing (the main measurement processing) for the color patch 31. The main measurement processing is measurement processing for measuring the color of the color patch 31 and is measurement processing for measuring the amount of light for each wavelength at 20 nm intervals in the visible light range of 380 nm to 680 nm, for example. Further, the filter control section 183 alternately switches a spectral wavelength of the spectroscope 17 to a plurality of wavelengths set in advance in order to determine a position of the measurement region R while the main measurement processing is not executed for the color patch 31, and executes the measurement processing.

The measurement value calculation section 184 stores a measured value obtained by spectroscopic processing of the spectroscope 17 and the spectral wavelength of the spectroscope 17 in the storage section 153 in association with each other. The spectral wavelength of the spectroscope 17 is a wavelength of the light that is transmitted through the variable wavelength interference filter 5 and is set by the filter control section 183. In the present embodiment, the measured value obtained by the spectroscopic processing of the spectroscope 17 is calculated based on a signal value of the detection signal output from the spectroscope 17. Specifically, the measurement value calculation section 184 adopts a representative value of a predetermined number of detection signals which are sampled during a predetermined sampling time as a measured value of the spectral wavelength. The representative value may be an average value of the signal values or a mode of the signal values. For example, in the present embodiment, 10 detection signals are sampled during the sampling time and the average value of the signal values of these detection signals is adopted as a measured value.

The determination section 185 determines whether the measurement region R which is measured by the spectroscope 17 is within a region of the color patch 31, that is, whether the measurement region R is shifted in position from the color patch and partially protrudes. Specifically, the determination section 185 causes the spectroscope 17 to execute the spectroscopic measurement processing with respect to the plurality of wavelengths set in advance while moving the spectroscope 17 along the X direction. The "plurality of wavelengths" described here are not the wavelengths used in the main measurement processing for measuring the color of the color patch 31, but are wavelengths for a position determination of the measurement region R, which are set in advance to determine whether the measurement region R is moved to the color patch 31 which is a measurement target. When the measured value of each wavelength varies simultaneously from the predetermined timing, and then the measured value of each wavelength converges to a constant value or a substantially constant value at the same timing, the determination section 185 determines that the measurement region R moves across the boundary between the color patches 31 adjacent to each other and the entire measurement region R has entered the destination color patch 31. That is, when at least one of the amounts of variation of the measured value of each wavelength exceeds the first threshold value, and then all the amounts of variation of the measured value of each wavelength have transitioned below the second threshold value, it is determined that the measurement region R is moved to the color patch 31 that is the target for executing the color measurement.

The color measurement section 186 measures a chromaticity of the color patch 31 based on the measured value obtained by the measurement processing for the color patch 31. The calibration section 187 corrects (updates) print profile data based on the colorimetric result of the color measurement section 186 and the data for calibration. The detailed operation of each functional configuration of the control unit 15 will be described later.

Measurement Method

Figure 6:
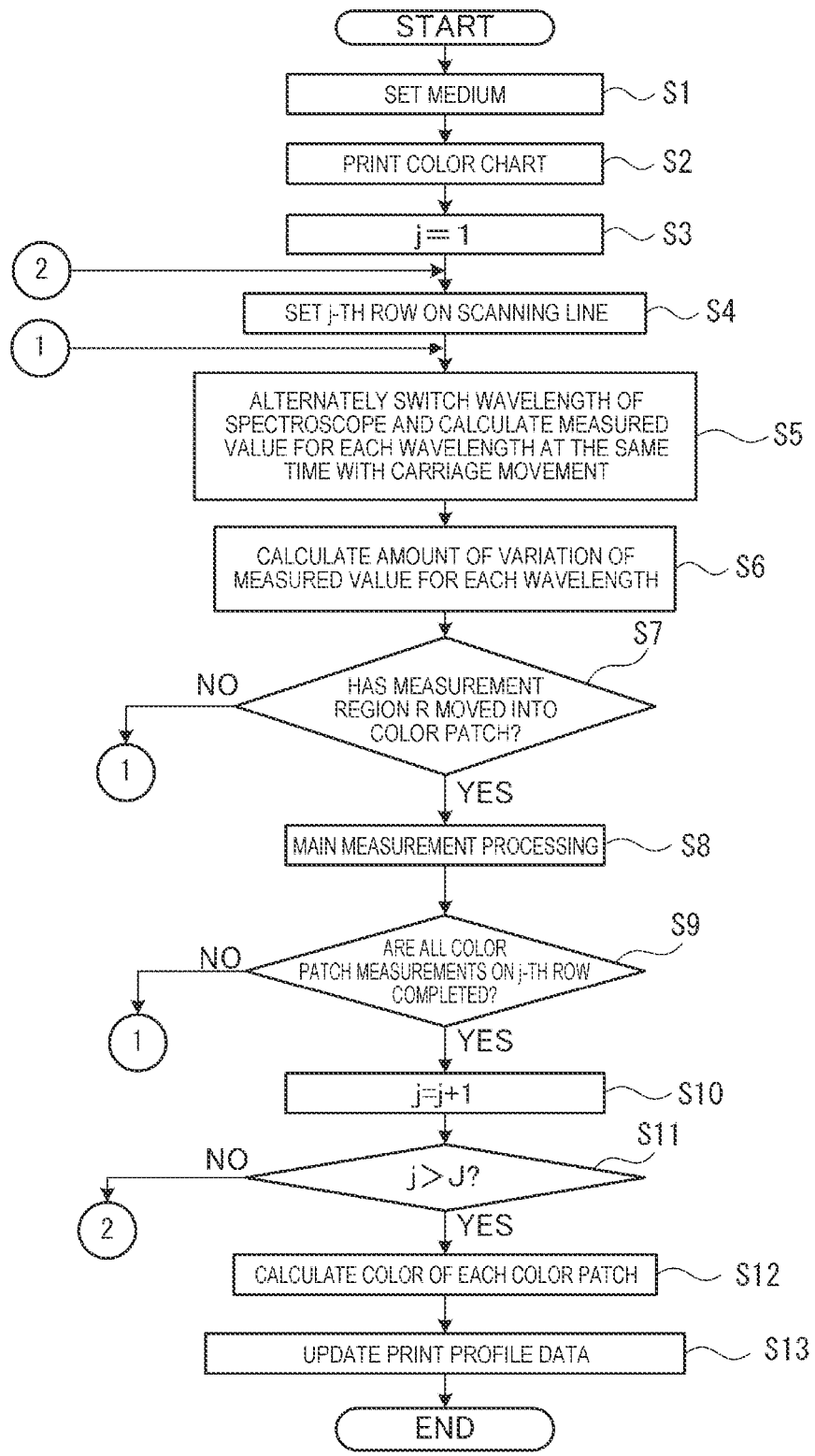
FIG. 6 is a flowchart illustrating a measurement method in the printer of the present embodiment.

Next, a spectroscopic measurement method in the printer 10 of the present embodiment will be described based on the drawings. FIG. 6 is a flowchart illustrating the spectroscopic measurement method in the printer 10. In the present embodiment, a wavelength range, which becomes a measurement target, is a visible light range of 400 nm to 700 nm, and an example is described in which the initial wavelength is defined as 700 nm and the spectroscopic measurement is performed based on the amount of light of the 16 wavelengths at 20 nm intervals.

In the measurement method of the present embodiment, first, the printer 10 forms a color chart including the color patch 31 on the medium A. The scan control section 181 sets the medium A at a predetermined position (step S1). That is, the scan control section 181 controls the supply unit 11 and the transport unit 12 to transport the medium A to the +Y side, and sets a predetermined print start position of the medium A on the platen 122. Further, the scan control section 181 moves the carriage 13 to an initial position which is positioned at an end portion in the −X side, for example.

Thereafter, the print control section 182 reads out the data for calibration from the storage section 153 and prints the color chart on the medium A in synchronization with the control by the scan control section 181 (step S2). That is, the scan control section 181 causes the carriage 13 to scan in the +X side at a predetermined speed. The print control section 182 specifies a position of the printing portion 16 according to the time from the start of scanning or the motor drive amount and forms dots by discharging the color ink, which is based on the data for calibration, to an image forming position, which is based on the data for calibration. Further, when the carriage 13 is moved to the end portion on the +X side, the scan control section 181 controls the supply unit 11 and the transport unit 12 to transport the medium A to the +Y side. The scan control section 181 causes the carriage 13 to scan to the −X side and the print control section 182 forms a dot at a predetermined position based on the data for calibration. A color chart is formed on the medium A by repeating the dot forming operation and the transport operation as described above.

Figure 7:
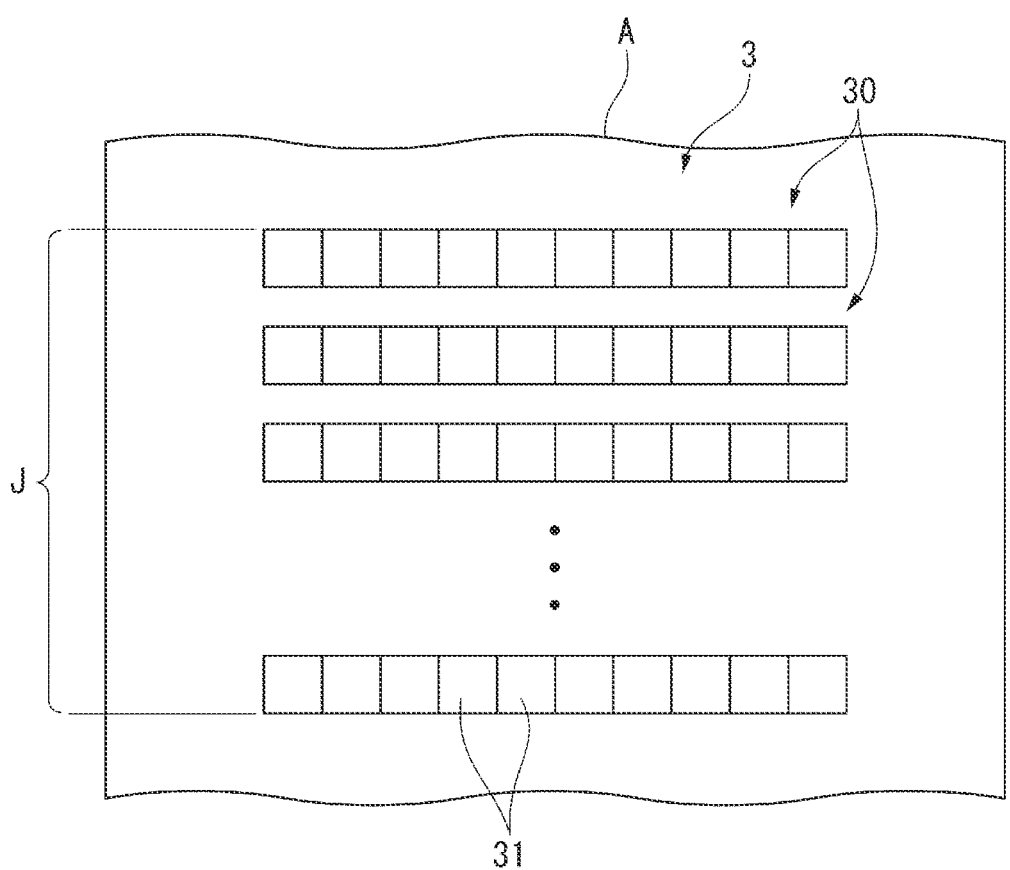
FIG. 7 is a diagram illustrating an example of a color chart in the present embodiment.

FIG. 7 is a diagram illustrating an example of a color chart formed in the present embodiment. In the present embodiment, as illustrated in FIG. 7, color patch groups 30 are formed by arranging a plurality of colors of the color patches 31 without gaps along the X direction. Further, a plurality of color patch groups 30 are formed along the Y direction. In this way, the color chart 3 is formed. In the following description, the color patch group 30 is arranged in J rows in the Y direction, and the number of rows of the color patch group 30, which becomes a measurement target, is indicated by a variable j (j is an integer from 1 to J).

Returning to FIG. 6, after step S2, the scan control section 181 initializes the variable j and sets j=1 (step S3). The scan control section 181 controls the transport unit 12 to transport the medium A along the Y direction, move the j-th row of the color patch 31 to the scanning line of the platen 122, and further, moves the carriage 13 to a predetermined initial position (for example, the end portion on the −X side) (step S4). The scanning line is an imaginary line in which the measurement region R which is measured by the spectroscope 17 moves when the carriage 13 is moved in the X direction.

After step S4, the control unit 15 moves the carriage 13 along the X direction, at the same time, alternately switches the spectral wavelength of the spectroscope 17 to a plurality of wavelengths for a position determination, and calculates a measured value with respect to each wavelength for a position determination (step S5). That is, the scan control section 181 moves the carriage 13 along the X direction. The filter control section 183 alternately applies a drive voltage corresponding to the plurality of wavelengths for a position determination set in advance to the electrostatic actuator 56. The measurement value calculation section 184 samples the detection signal output from the spectroscope 17, and calculates each of the measured values with respect to each wavelength for a position determination based on the signal values of the predetermined number of sampled detection signals.

Figure 8:
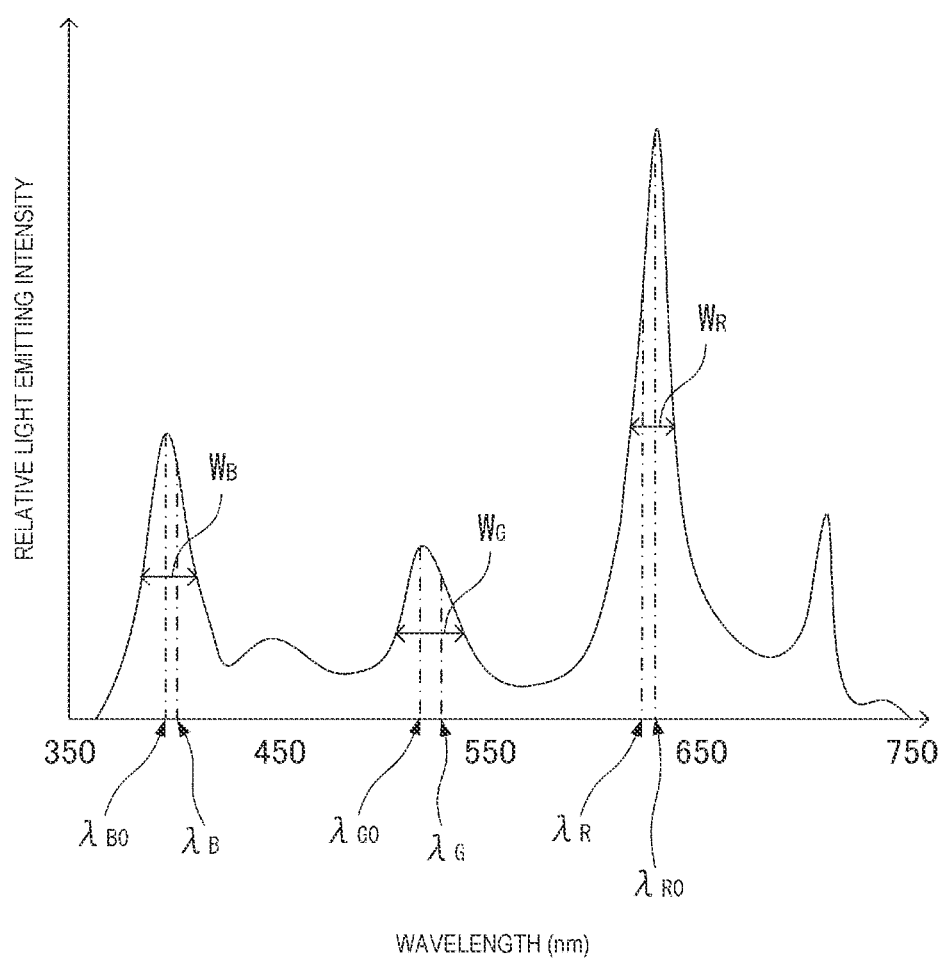
FIG. 8 is a diagram illustrating an example of a light emitting spectrum of a light source of the present embodiment.

The plurality wavelengths for a position determination set in advance are wavelengths in the vicinity of the peak wavelength of the light emitting spectrum of the light source 171A. FIG. 8 illustrates an example of the light emitting spectrum of the light source 171A. FIG. 8 is an example of a light emitting spectrum when a white LED in which an ultraviolet LED and an RGB phosphor are combined is used as the light source 171A. In the present embodiment, among the light emitting spectrum of the light source 171A, a first wavelength $\lambda_B$ included in a blue wavelength range (B wavelength range) of 380 nm to 480 nm, a second wavelength $\lambda_G$ included in a green wavelength range (G wavelength range) of 480 nm to 580 nm, and a third wavelength $\lambda_R$ included in a red wavelength range (R wavelength range) of 580 nm to 680 nm are used as the plurality of wavelengths set in advance.

More specifically, the first wavelength $\lambda_B$, the second wavelength $\lambda_G$, and the third wavelength $\lambda_R$ are light emitting spectrums and wavelengths within a predetermined wavelength range centered at a peak wavelength at which the amount of light reaches a maximum value. The predetermined wavelength range centered at the peak wavelength is a wavelength range in which an amount of light larger than or equal to half the peak value of the amount of light corresponding to the peak wavelength can be obtained. That is, as illustrated in FIG. 8, the first wavelength $\lambda_B$ is a wavelength within a wavelength range $W_B$ centered at a peak wavelength $\lambda_{B0}$ in the B wavelength range. The second wavelength $\lambda_G$ is a wavelength within a wavelength range $W_G$ centered at a peak wavelength $\lambda_{G0}$ in the G wavelength range. The third wavelength $\lambda_R$ is a wavelength within a wavelength range $W_R$ centered at a peak wavelength $\lambda_{R0}$ in the R wavelength range. Further, in the present embodiment, as illustrated in FIG. 8, as the first wavelength $\lambda_B$, the second wavelength $\lambda_G$, and the third wavelength $\lambda_R$, wavelengths slightly shifted from the peak wavelengths $\lambda_{B0}$, $\lambda_{G0}$, and $\lambda_{R0}$ are used. At the first wavelength $\lambda_B$, the second wavelength $\lambda_G$, and the third wavelength $\lambda_R$, which are slightly shifted from the peak wavelength, the amount of variation of the amount of light in the light emitting spectrum becomes steep. That is, in the present embodiment, an absolute value of the slope of the light emitting spectrum at the first wavelength $\lambda_B$, the second wavelength $\lambda_G$, and the third wavelength $\lambda_R$ is greater than or equal to a predetermined value.

Therefore, in step S5, the filter control section 183 alternately switches the dimension of a gap G of the variable wavelength interference filter 5 to the dimension corresponding to the first wavelength $\lambda_B$, the dimension corresponding to the second wavelength $\lambda_G$, and the dimension corresponding to the third wavelength $\lambda_R$. Thereby, a detection signal that received the light of the first wavelength $\lambda_B$, a detection signal that received the light of the second wavelength $\lambda_G$, and a detection signal that received the light of the third wavelength $\lambda_R$ are output from the light receiving portion 173 of the spectroscope 17. When a voltage is applied to the electrostatic actuator 56 of the variable wavelength interference filter 5, the movable portion 521 vibrates. Therefore, it takes time for the gap G to have a dimension corresponding to the spectral wavelength. Therefore, in the present embodiment, the stabilization time for the vibration of the movable portion 521 to converge is measured in advance. Further, after the stabilization time has elapsed from the timing when the voltage is applied to the electrostatic actuator 56, the measurement value calculation section 184 receives the signal values of a predetermined number of sampled detection signals from the spectroscope 17 and calculates a measured value.

The stabilization time until the gap G has a dimension corresponding to the spectral wavelength is sufficiently short, for example, is several msec. Further, the sampling frequency for sampling a detection signal is, for example, 1 kHz, and in this case, the time for acquiring, for example, 10 signal values is substantially 0.01 sec. Therefore, even when the spectral wavelength of the spectroscope 17 is alternately switched to the first wavelength $\lambda_B$, the second wavelength $\lambda_G$, and the third wavelength $\lambda_R$, and the measured value for each wavelength is acquired, the measured value is substantially less than or equal to 0.05 sec. On the other hand, the movement speed for moving the carriage 13 in the X direction is sufficiently slower than the wavelength switching speed measured by the spectroscope 17 and the sampling speed of the detection signal. Therefore, a measurement position where the light of the first wavelength $\lambda_B$ is measured, a measurement position where the light of the second wavelength $\lambda_G$ is measured, and a measurement position where the light of the third wavelength $\lambda_R$ is measured can be regarded as substantially the same position.

Next, the determination section 185 calculates an amount of variation of the first measured value $\Delta V_1$ (see FIG. 9), an amount of variation of the second measured value $\Delta V_2$ (see FIG. 9), and an amount of variation of the third measured value $\Delta V_3$ (see FIG. 9) (step S6). Specifically, based on the first measured value $V_{1(n)}$ which is measured at the n-th time, and the first measured value $V_{1(n-1)}$ which is measured at the (n−1)-th time by the measurement value calculation section 184, the determination section 185 calculates the amount of variation $\Delta V_1$ using $\Delta V_1 = |V_{1(n)} - V_{1(n-1)}|$. Similarly, based on the second measured value $V_{2(n)}$ which is measured at the n-th time, and the second measured value $V_{2(n-1)}$ which is measured at the (n−1)-th time, the determination section 185 calculates the amount of variation $\Delta V_2$ using $\Delta V_2 = |V_{2(n)} - V_{2(n-1)}|$. Further, based on the third measured value $V_{3(n)}$ which is measured at the n-th time, and the third measured value $V_{3(n-1)}$ which is measured at the (n−1)-th time, the determination section 185 calculates the amount of variation $\Delta V_3$ using $\Delta V_3 = |V_{3(n)} - V_{3(n-1)}|$.

The determination section 185 determines whether the entire measurement region R is moved into the color patch 31 based on the amount of variation of the first measured value $\Delta V_1$, the amount of variation of the second measured value $\Delta V_2$, and the amount of variation of the third measured value $\Delta V_3$ (step S7).

Figure 9:
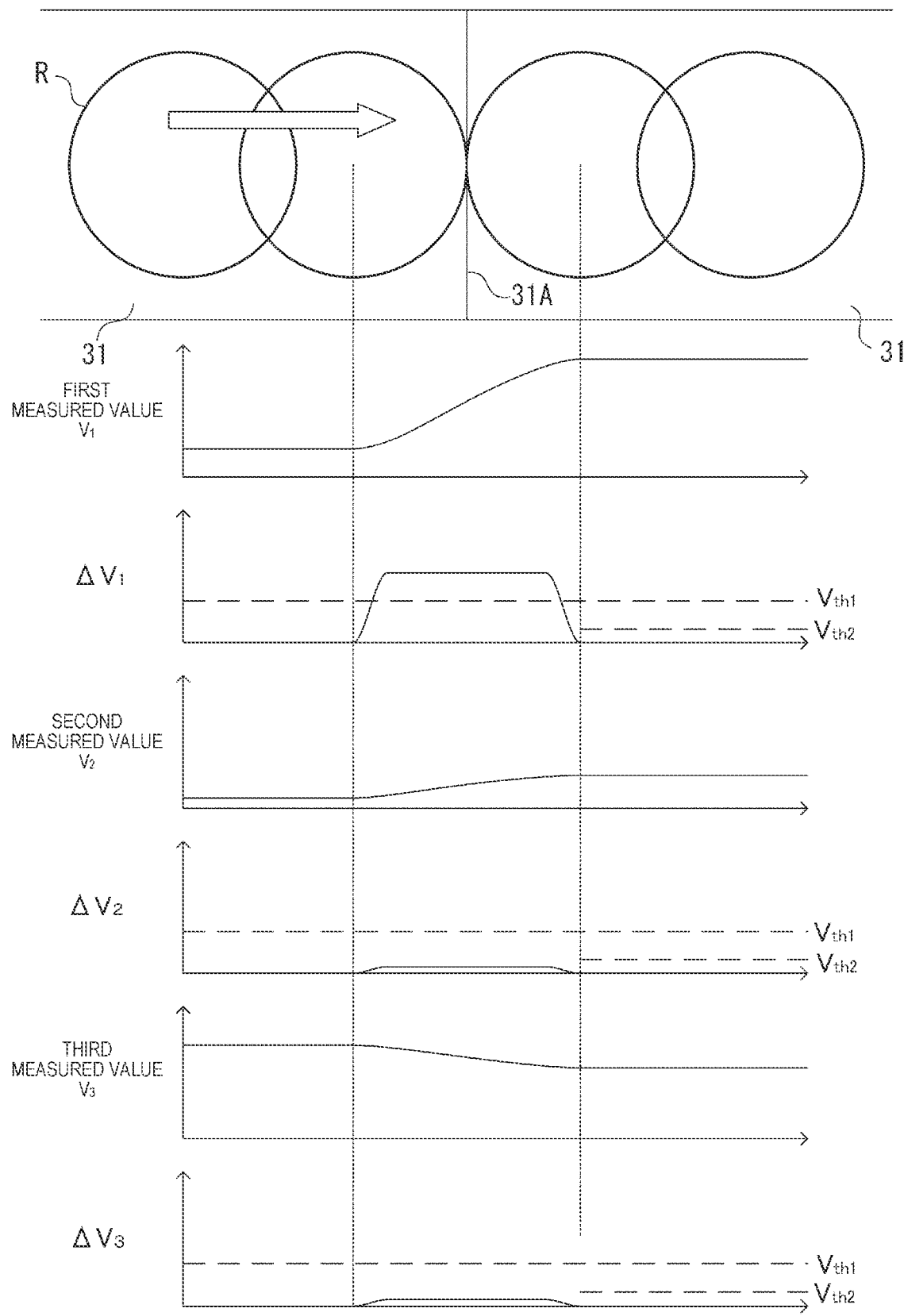
FIG. 9 is a diagram illustrating variations of a first measured value, a second measured value, and a third measured value when a measurement region is moved along the X direction in the present embodiment.

The process of step S7 will be described in more detail below. FIG. 9 is a diagram for explaining the process of step S7 and is a diagram illustrating variations of the first measured value, the second measured value, and the third measured value when the measurement region R is moved along the X direction. As illustrated in FIG. 9, when the measurement region R straddles the boundary 31A of the color patch 31, the first measured value, the second measured value, and the third measured value increase or decrease. However, when the colors of the color patches 31 adjacent to each other are similar colors, the variation of the measured value may be small. In contrast to this, in the present embodiment, the measured values with respect to the three wavelengths of the first wavelength $\lambda_B$, the second wavelength $\lambda_G$, and the third wavelength $\lambda_R$ are monitored. Therefore, even when the color patches 31 adjacent to each other have the same color, at least one of the amount of variation of the first measured value, the amount of variation of the second measured value, and the amount of variation of the third measured value become large.

For example, in the example illustrated in FIG. 9, the second measured value and the third measured value vary according to the movement of the measurement region R, and the amount of variation falls below a first threshold value $V_{th1}$. Therefore, it is difficult to specify a position of the measurement region R with respect to the color patch 31 using only the second measured value and the only third measured value. However, the amount of variation of the first measured value exceeds the first threshold value $V_{th1}$ when the measurement region R straddles the boundary 31A of the color patch 31. Therefore, it can be detected from the amount of variation of the first measured value that the measurement region R straddles the color patch. The first threshold value $V_{th1}$ is a reference for determining whether the amount of variation of the measured value is large and a user may set the threshold value to any value. For example, by lowering the first threshold value $V_{th1}$, even when the colors of the color patches 31 adjacent to each other are similar, the accuracy of determining whether the entire measurement region R is positioned on one color patch 31 is improved. On the other hand, by increasing the first threshold value $V_{th1}$, it is possible to suppress the influence of noise included in the detection signal.

Figure 10:
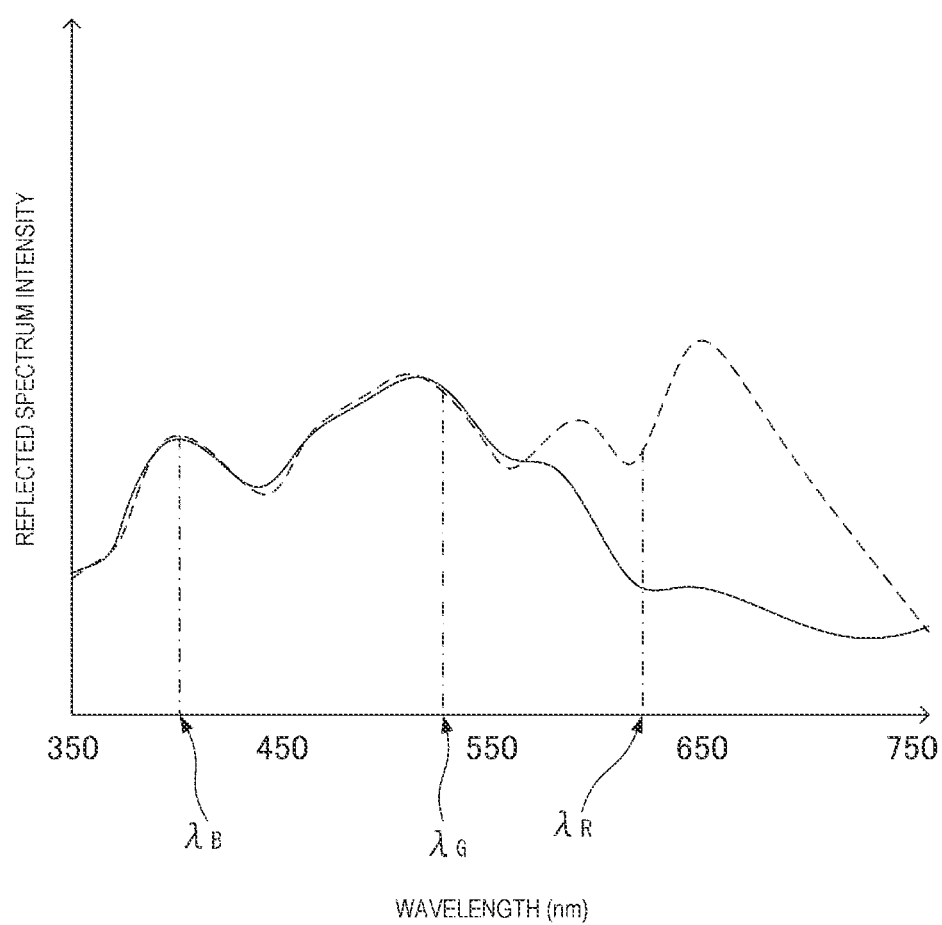
FIG. 10 is a diagram illustrating an example of a reflected spectrum of a first color patch and an example of a reflected spectrum of a second color patch that are arranged adjacent to each other in the X direction.

Further, in the present embodiment, the first wavelength $\lambda_B$ is a wavelength included in the B wavelength range, the second wavelength $\lambda_G$ is a wavelength included in the G wavelength range, and the third wavelength $\lambda_R$ is a wavelength included in the R wavelength range. In this way, by increasing the difference between the first wavelength $\lambda_B$ and the second wavelength $\lambda_G$, and the difference between the second wavelength $\lambda_G$ and the third wavelength $\lambda_R$, respectively, even when the color patches 31 adjacent to each other have the same color, it is easy to detect the measured value in which the amount of variation exceeds the first threshold value $V_{th1}$. FIG. 10 is a diagram illustrating an example of a reflected spectrum of a first color patch 31 and an example of a reflected spectrum of a second color patch 31 that are arranged adjacent to each other in the X direction. In FIG. 10, the solid line indicates the reflected spectrum of the first color patch 31, and the broken line indicates the reflected spectrum of the second color patch 31. For example, when the measurement region R moves from the first color patch 31 to the second color patch 31 as illustrated in FIG. 10, when all of the first wavelength $\lambda_B$, the second wavelength $\lambda_G$, and the third wavelength $\lambda_R$ are set within the B wavelength range, for example, a measured value in which the amount of variation exceeds the first threshold value $V_{th1}$ is not detected. In contrast to this, in the present embodiment, even when the two color patches 31 are adjacent to each other as illustrated in FIG. 10, the amount of variation of the third measured value becomes an amount of variation exceeding the first threshold value $V_{th1}$, so it can be detected that the measurement region R moves across the boundary 31A of the color patch 31.

Furthermore, as described above, the first wavelength $\lambda_B$, the second wavelength $\lambda_G$, and the third wavelength $\lambda_R$ are wavelengths in the vicinity of the peak wavelength of the light emitting spectrum of the light source 171A. Therefore, for example, the measured value becomes larger as compared with the case of using a wavelength in the vicinity of the bottom wavelength at which the amount of light has a minimum value in the light emitting spectrum. In this case, since the variation width of the measured value is also large, the amount of variation of the measured value when the measurement region R straddles the boundary 31A of the color patch 31 is large.

On the other hand, when the measurement region R advances in the region of the same color on the medium A, the amount of variation of the first measured value $\Delta V_1$, the amount of variation of the second measured value $\Delta V_2$, and the amount of variation of the third measured value $\Delta V_3$ are small and less than a second threshold value $V_{th2}$. For example, in the example illustrated in FIG. 9, while the measurement region R is being moved in the color patch 31, the amount of variation of the first measured value, the amount of variation of the second measured value, and the amount of variation of the third measured value are below the second threshold value $V_{th2}$, and it can be detected that the measurement region R is being moved in the same color portion. The second threshold value $V_{th2}$ is a reference for determining whether the amount of variation of the measured value becomes a constant value, and the user may set the threshold value to any value as with the first threshold value $V_{th1}$. For example, by lowering the second threshold value $V_{th2}$, it is possible to accurately determine whether the variation of the measured value has converged, and by increasing the second threshold value $V_{th2}$, it is possible to suppress the influence of noise included in the detection signal. The second threshold value $V_{th2}$ is a value less than or equal to the first threshold value $V_{th1}$, and for example, the first threshold value $V_{th1}$ and the second threshold value $V_{th2}$ may be the same value.

A period in which the measurement region R straddles the boundary 31A of the color patch 31, that is, a period in which the boundary 31A of the color patch 31 is included in the measurement region R is set as a first period. Further, a timing when the entire measurement region R enters the color patch 31 is set as an end timing of the first period, and a period in which the measurement region R advances within the color patch 31 by a predetermined distance from the end timing of the first period is set as a second period. In step S7, the determination section 185 determines, in the first period, whether at least one of the amount of variation of the first measured value $\Delta V_1$, the amount of variation of the second measured value $\Delta V_2$, and the amount of variation of the third measured value $\Delta V_3$ exceeds the first threshold value $V_{th1}$, and determines, in the second period that follows the first period, whether each of the amounts of variation of the first measured value, the second measured value, and the third measured value $\Delta V_1$, $\Delta V_2$, and $\Delta V_3$ falls below the second threshold value $V_{th2}$. In other words, when the first period, in which at least one of the amount of variation of the first measured value $\Delta V_1$, the amount of variation of the second measured value $\Delta V_2$, and the amount of variation of the third measured value $\Delta V_3$ exceeds the first threshold value $V_{th1}$, is detected, the determination section 185 determines whether the second period, in which each of the amounts of variation of the first measured value, the second measured value, and the third measured value $\Delta V_1$, $\Delta V_2$, and $\Delta V_3$ falls below the second threshold value $V_{th2}$, is detected.

When it is determined as NO in step S7, the process returns to step S5. That is, the control unit 15 continues the processing from step S5 to step S7 until the determination section 185 determines that the entire measurement region R is moved into the color patch 31. When it is determined as YES in step S7, it means that the entire measurement region R is positioned within the color patch 31. In this case, the filter control section 183 executes the spectroscopic measurement processing (the main measurement processing) for the color patch 31 (step S8). Specifically, the filter control section 183 sequentially changes the voltage applied to the electrostatic actuator 56 based on the V-$\lambda$ data. Thereby, for example, the detection signal with respect to the 16 band light in the visible light range is output from the spectroscope 17 to the control unit 15. Similar to step S5, the measurement value calculation section 184 averages the signal values of these detection signals to obtain a measured value and stores the measured value in the storage section 153 in association with the spectral wavelength of the spectroscope 17.

Thereafter, the control unit 15 determines whether the spectroscopic measurement processing is completed for all the color patches 31 in the color patch group 30 arranged in the j-th row (step S9). For example, the control unit 15 counts the number of executions of step S8 and determines whether the counted number is the total number I of the color patches 31 arranged in the color patch group 30. When it is determined as NO in step S9, the process returns to step S5.

When it is determined as YES in step S9, the scan control section 181 adds "1" to the variable j (step S10) and determines whether the variable j is larger than the maximum value J (step S11). When it is determined as NO in step S11, the process returns to step S4.

When it is determined as YES in step S11, the color measurement section 186 calculates the color of each color patch 31 based on the measurement result of the main measurement processing in step S8 executed for each color patch 31 (step S12). For example, the color measurement section 186 calculates the reflectance spectrum of each color patch 31. Thereafter, the calibration section 187 updates the print profile data stored in the storage section 153 based on the data for calibration and the color calculated from step S12 (step S13).

Operation Effects of Present Embodiment

The printer 10 of the present embodiment includes the carriage 13 having a spectroscope 17 capable of measuring the light with a predetermined spectral wavelength of the incident light from the medium A, which is a measurement target, and changing the spectral wavelength and the carriage moving unit 14 that moves the carriage 13 with respect to the medium A in the X direction. Further, the control unit 15 of the printer 10 causes the spectroscope 17 to execute the measurement processing for the first wavelength $\lambda_B$, the second wavelength $\lambda_G$, and the third wavelength $\lambda_R$ set in advance while moving the carriage 13 in the X direction. Further, when at least one of the amount of variation of the first measured value $\Delta V_1$, the amount of variation of the second measured value $\Delta V_2$, and the amount of variation of the third measured value $\Delta V_3$ obtained by the measurement processing exceeds the first threshold value $V_{th1}$, and thereafter when the amount of variation of the first measured value $\Delta V_1$, the amount of variation of the second measured value $\Delta V_2$, and the amount of variation of the third measured value $\Delta V_3$ are all below the second threshold value $V_{th2}$, the control unit 15 determines that the measurement region R is moved into the color patch.

In this way, even when the color patches 31 adjacent to each other are of similar colors, a position determination of the measurement region R can be accurately performed based on the amount of variation of measurement with respect to the plurality of wavelengths. That is, it is possible to accurately determine whether the measurement region R is moved into the color patch 31 to be measured crossing the boundary 31A of the color patch 31.

In the present embodiment, the control unit 15 alternately switches the spectral wavelength of the light measured by the spectroscope 17 to the first wavelength $\lambda_B$, the second wavelength $\lambda_G$, and the third wavelength $\lambda_R$ while moving the carriage 13 in the X direction. With such a configuration, the variations of the measured values of the first wavelength $\lambda_B$, the second wavelength $\lambda_G$, and the third wavelength $\lambda_R$ can be monitored by one spectroscope 17 and, for example, compared with the configuration in which the carriage 13 is provided with a plurality of spectroscopes, the device can be simplified and the weight of the carriage 13 can be reduced.

In the printer 10 of the present embodiment, the spectroscope 17 includes the light source 171A for irradiating the measurement region R with light. The first wavelength $\lambda_B$, the second wavelength $\lambda_G$, and the third wavelength $\lambda_R$ are wavelengths within a predetermined wavelength range centered at the peak wavelength of the light emitting spectrum of the light source 171A. Further, the predetermined wavelength range is a wavelength range in which an amount of light larger than or equal to half the peak amount light is obtained. Thereby, the first measured value, the second measured value, and the third measured value can be increased as compared with the case where wavelengths in the vicinity of the bottom wavelength are used as the first wavelength $\lambda_B$, the second wavelength $\lambda_G$, and the third wavelength $\lambda_R$. Further, the variation width of the first measured value, the variation width of the second measured value, and the variation width of the third measured value can be increased, and the position determination of the measurement region R can be accurately performed.

In the present embodiment, the first wavelength $\lambda_B$ is a wavelength included in the B wavelength range, the second wavelength $\lambda_G$ is a wavelength included in the G wavelength range, and the third wavelength $\lambda_R$ is a wavelength included in the R wavelength range. Therefore, even when the measurement region R moves between the color patches 31 adjacent to each other having the same color, the position determination of the measurement region R can be appropriately performed regardless of the color system of the color patch 31.

In the present embodiment, the detection signals output from the spectroscope 17 are sampled at a predetermined sampling cycle, and the measurement value calculation section 184 averages the signal values of a predetermined number of sampled detection signals to obtain a measured value. That is, each of the first measured value for the first wavelength $\lambda_B$, the second measured value for the second wavelength $\lambda_G$, and the third measured value for the third wavelength $\lambda_R$ is measured at a predetermined cycle. The determination section 185 then calculates a difference between consecutive measured values, that is, an absolute value of a difference between the measured value, which is measured at the n-th time, and the measured value, which is measured at the (n−1)-th time, as the amount of variation of the measured value. Thereby, every time the measured value is calculated, the absolute value of the difference between the measured value and the previously measured value is calculated, and the variation of the measured value can be appropriately calculated.

MODIFICATION EXAMPLES

The present disclosure is not limited to the above-described embodiments, and the present disclosure includes modifications, improvements, and combinations obtained by appropriately combining the embodiments within a range that can achieve the object of the present disclosure.

Modification Example 1

In the above-described embodiment, the carriage 13, which is a spectroscopic measurement portion, includes one spectroscope 17, and the gap G of the variable wavelength interference filter 5 provided in the spectroscope 17 is alternately switched to dimensions corresponding to the first wavelength $\lambda_B$, the second wavelength $\lambda_G$, and the third wavelength $\lambda_R$. In contrast to this, a plurality of spectroscopes 17 may be provided on the carriage 13, which is a spectroscopic measurement portion, and each spectroscope 17 may perform a spectroscopic measurement with respect to the same measurement region R on the medium A. For example, the carriage 13 may be provided with a first spectroscope, a second spectroscope, and a third spectroscope. In this case, instead of alternately switching the spectral wavelength of one spectroscope 17 to the first wavelength $\lambda_B$, the second wavelength $\lambda_G$, and the third wavelength $\lambda_R$, the first spectroscope can measure the light of the first wavelength $\lambda_B$, the second spectroscope can measure the light of the second wavelength $\lambda_B$, and the third spectroscope can measure the light of the third wavelength $\lambda_R$. Further, in the main measurement processing, the spectroscopic measurement processing for the color patch 31 may be executed by any of the three spectroscopes, and the average value of the measurement results of the three spectroscopes is adopted as the measured value of the main measurement processing.

Further, a first differentiating circuit for outputting a differential signal of the detection signal output from the first spectroscope, a second differentiating circuit for outputting a differential signal of the detection signal output from the second spectroscope, and a third differentiating circuit for outputting a differential signal of the detection signal output from the third spectroscope may be included. In this case, since each differential signal becomes a signal indicating the amount of variation of the measured value, the process of step S5, that is, a process of calculating the amount of variation of the measured value by the determination section 185 can be omitted.

Modification Example 2

In the above embodiment, the first wavelength $\lambda_B$, the second wavelength $\lambda_G$, and the third wavelength $\lambda_R$ are exemplified as a plurality of wavelengths, but for example, only the first wavelength $\lambda_B$ and the second wavelength $\lambda_G$ may be used, or four or more wavelengths may be used.

Further, the first wavelength $\lambda_B$ is included in the B wavelength range, the second wavelength $\lambda_G$ is included in the G wavelength range, and the third wavelength $\lambda_R$ is included in the R wavelength range, but for example, a wavelength in the vicinity of 480 nm between the B wavelength range and the G wavelength range, and a wavelength in the vicinity of 580 nm between the G wavelength range and the R wavelength range may be used.

Furthermore, the wavelengths slightly shifted from the peak wavelength of each color region are used as the first wavelength $\lambda_B$, the second wavelength $\lambda_G$, and the third wavelength $\lambda_R$, but the peak wavelength of each color region may be used. For example, the first wavelength $\lambda_B$ may be the peak wavelength in the B wavelength range, the second wavelength $\lambda_G$ may be the peak wavelength in the G wavelength range, and the third wavelength $\lambda_R$ may be the peak wavelength in the R wavelength range. The first wavelength $\lambda_B$, the second wavelength $\lambda_G$, and the third wavelength $\lambda_R$ may be wavelengths in the vicinity of the bottom wavelength.

Furthermore, in the above embodiment, the first wavelength $\lambda_B$, the second wavelength $\lambda_G$, and the third wavelength $\lambda_R$, which are the plurality of wavelengths for a position determination, are fixed values, but for example, the wavelengths maybe changed depending on the types of medium A and the color patch 31. For example, when the color patches 31 of similar colors are continuous based on the data for calibration, at least one of the first wavelength, the second wavelength, and the third wavelength may be changed to a wavelength having a different reflectance between the color patches 31 adjacent to each other.

Modification Example 3

In the above embodiment, an example in which the measurement region R is a circular spot is illustrated, but the present disclosure is not limited to this. For example, the measurement region R may have a rectangular shape.

Modification Example 4

In the above embodiment, the carriage moving unit 14 that moves the carriage 13 in the +X direction is exemplified as the movement mechanism according to the present disclosure, but the present disclosure is not limited thereto. For example, the carriage 13 may be fixed and the medium A may be moved with respect to the carriage 13. In this case, it is possible to suppress the vibration of the variable wavelength interference filter 5 which is associated with the movement of the carriage 13 and stabilize the transmission wavelength of the variable wavelength interference filter 5. Further, an example has been illustrated in which the measurement region R is scanned along the X direction with respect to the plurality of color patches 31 that are arranged along the X direction, but the measurement region R may be scanned along the Y direction with respect to the color patch 31. In this case, by transporting the medium A by the transport unit 12 in the Y direction, the measurement region R can be relatively moved to the color patch 31.

Modification Example 5

In each of the above-described embodiments, the color patch group 30 in which the plurality of color patches 31 are arranged adjacent to each other in the X direction is exemplified, but a configuration in which a gap is provided between the respective color patches 31 may be used. When a first color patch 31 and a second color patch 31 are adjacent to each other with a gap and the width of the gap is smaller than the width of the measurement region R in the X direction, the boundary 31A of any one of the color patches is included in the measurement region R until the entire measurement region R moves to the second color patch 31. That is, after the measurement region R approaches the boundary 31A of the first color patch 31, the measured value of each wavelength continues to vary until the entire measurement region R enters the second color patch 31. Therefore, it is possible to determine whether the entire measurement region R has entered the second color patch 31 by the same processing as in the above embodiment.

Modification Example 6

In the above embodiment, the example has been described in which the spectroscopic measurement processing for each color patch 31 is executed while moving the carriage 13 to the +X side, but the spectroscopic measurement processing for each color patch 31 may be executed while moving the carriage 13 to the −X side.

Modification Example 7

In the above embodiment, the printer 10 is exemplified as an example of the measurement device, but the present disclosure is not limited to this. For example, a measurement device that does not include the printing portion 16 and executes only color measurement processing on the medium A may be used.

Modification Example 8

In the above embodiment, an example has been described in which the carriage 13 is moved at a constant speed in the X direction, but the present disclosure is not limited to this. For example, the relative movement speed of the spectroscopic measurement portion may not be constant, and a handy-type measurement device in which the spectroscopic measurement portion is manually moved may be used. In the present disclosure, even with such a handy-type measurement device, the position determination of the measurement region R is performed based on the variation of the measured value with respect to a plurality of wavelengths. Therefore, regardless of the relative movement speed of the spectroscopic measurement portion, it can be appropriately determined whether the measurement region R is moved into the color patch.

Modification Example 9

In each of the above-described embodiments, an example has been described in which the spectroscope 17 includes the variable wavelength interference filter 5 as a spectroscopic element capable of changing the spectral wavelength when the light from the measurement target is dispersed, but the present disclosure is not limited to this. For example, the spectroscope 17 may be configured to include various types of spectroscopic elements such as acousto-optic tunable filter (AOTF), liquid crystal tunable filter (LCTF), and grating that can change the spectral wavelength instead of the variable wavelength interference filter 5. Further, in the above embodiment, an example has been described in which the spectroscope 17 has a so-called post-spectroscopic type configuration where the incident light from the medium A is dispersed, but a so-called pre-spectroscopic type configuration may be adopted in which illumination light from the light source portion 171 is dispersed into a predetermined spectral wavelength and is applied to the medium A.

Roundup of Present Disclosure

According to a first aspect of the present disclosure, there is provided a measurement device including: a spectroscope configured to measure light with a predetermined spectral wavelength of incident light from a measurement target and change the spectral wavelength; a movement mechanism configured to relatively move the spectroscope in one direction with respect to the measurement target; and one or more processors configured to determine, when the measurement target is a color patch and the spectroscope is relatively moved in the one direction, whether or not a measurement position measured by the spectroscope is moved into the color patch, in which the one or more processors cause the spectroscope to execute measurement processing for a plurality of wavelengths set in advance while relatively moving the spectroscope in the one direction, and when at least one of amounts of variation of measured values with respect to each of the plurality of wavelengths obtained in the measurement processing exceeds a first threshold value and then each of the amounts of variation of the measured values of the plurality of wavelengths falls below a second threshold value which is less than or equal to the first threshold value, determine that the measurement position is moved into the color patch.

As described above, even when the color patches adjacent to each other are of the same color, a position determination with respect to the color patch at measurement position can be properly performed based on the amount of variation of the measurement with respect to the plurality of wavelengths. That is, it is possible to accurately determine whether the measurement position is moved into the color patch to be measured crossing the boundary of the color patch.

In the measurement device of the present aspect, the one or more processors may alternately switch the spectral wavelength of light measured by the spectroscope to the plurality of wavelengths while relatively moving the spectroscope in the one direction. With such a configuration, the spectroscope needs only one spectroscopic element for switching the spectral wavelength and can monitor variations of the measured values with respect to the plurality of wavelengths with a simple configuration.

In the measurement device of the present aspect, the measurement device further includes a light source irradiating the measurement position with light, in which the plurality of wavelengths may be wavelengths within a predetermined wavelength range centered at a peak wavelength of a light emitting spectrum of the light source, and the predetermined wavelength range may be a wavelength range in which an amount of light larger than or equal to half a peak light amount corresponding to the peak wavelength is obtained. As described above, the measured values with respect to each of the plurality of wavelengths can be increased as compared with the case where the wavelengths in the vicinity of the bottom wavelength of the light emitting spectrum are used as the plurality of wavelengths. Further, since the variation width of the measured value becomes large, it is possible to properly determine whether the amount of variation of the measured value exceeds the first threshold value.

In the measurement device of the present aspect, the plurality of wavelengths may include a first wavelength in a blue wavelength range, a second wavelength in a green wavelength range, and a third wavelength in a red wavelength range. Therefore, even when the measurement position moves between the color patches adjacent to each other of the same color, a measured value in which the amount of variation exceeds the first threshold value appears regardless of the color system of the color patch. As described above, the position determination with respect to the color patch at the measurement position can be properly performed.

In the measurement device of the present aspect, the measured value may be measured in a predetermined cycle, and the one or more processors may set an absolute value of a difference between the measured value that is measured at an n-th time and the measured value that is measured at an (n−1)-th time as the amount of variation of the measured value. Thereby, every time the measured value is calculated, the absolute value of the difference between the measured value and the previously measured value is calculated, and the variation of the measured value can be appropriately calculated.

According to a second aspect of the present disclosure, there is provided a measurement method of a measurement device including a spectroscope configured to measure light with a predetermined spectral wavelength of incident light from a measurement target and change the spectral wavelength, and a movement mechanism configured to relatively move the spectroscope in one direction with respect to the measurement target, the method including: when the measurement target is a color patch, causing the spectroscope to execute measurement processing for a plurality of wavelengths set in advance while relatively moving the spectroscope in the one direction, and when at least one of amounts of variation of measured values with respect to each of the plurality of wavelengths obtained in the measurement processing exceeds a first threshold value and then each of the amounts of variation of the measured values of the plurality of wavelengths falls below a second threshold value which is less than or equal to the first threshold value, determining that a measurement position measured by the spectroscope is moved into the color patch. As described above, even when the color patches adjacent to each other are of the same color, a position determination with respect to the color patch at measurement position can be properly performed based on the amount of variation of the measurement with respect to the plurality of wavelengths.

What is claimed is:

1. A measurement device comprising:
   a spectroscope configured to measure light with a predetermined spectral wavelength of incident light from a measurement target and change the spectral wavelength;
   a movement mechanism configured to relatively move the spectroscope in one direction with respect to the measurement target; and
   one or more processors configured to determine, when the measurement target is a color patch and the spectroscope is relatively moved in the one direction, whether or not a measurement position measured by the spectroscope is moved into the color patch, wherein
      the one or more processors cause the spectroscope to execute measurement processing for a plurality of wavelengths set in advance while relatively moving the spectroscope in the one direction, and when at least one of amounts of variation of measured values with respect to each of the plurality of wavelengths obtained in the measurement processing exceeds a first threshold value and then each of the amounts of variation of the measured values of the plurality of wavelengths falls below a second threshold value which is less than or equal to the first threshold value, determine that the measurement position is moved into the color patch.

2. The measurement device according to claim 1, wherein the one or more processors alternately switch the spectral wavelength of light measured by the spectroscope to the plurality of wavelengths while relatively moving the spectroscope in the one direction.

3. The measurement device according to claim 1, further comprising:
   a light source irradiating the measurement position with light, wherein
      the plurality of wavelengths are wavelengths within a predetermined wavelength range centered at a peak wavelength of a light emitting spectrum of the light source, and
      the predetermined wavelength range is a wavelength range in which an amount of light larger than or equal to half a peak light amount corresponding to the peak wavelength is obtained.

4. The measurement device according to claim 1, wherein the plurality of wavelengths include a first wavelength in a blue wavelength range, a second wavelength in a green wavelength range, and a third wavelength in a red wavelength range.

5. The measurement device according to claim 1, wherein the measured value is measured in a predetermined cycle, and
   the one or more processors sets an absolute value of a difference between the measured value that is measured at an n-th time and the measured value that is measured at an (n−1)-th time as the amount of variation of the measured value.

6. A measurement method of a measurement device including a spectroscope configured to measure light with a predetermined spectral wavelength of incident light from a measurement target and change the predetermined spectral wavelength, a movement mechanism configured to relatively move the spectroscope in one direction with respect to the measurement target, and one or more processors, the method comprising:
   determining, by the one or more processors, when the measurement target is a color patch and the spectroscope is relatively moved in the one direction, whether or not a measurement position measured by the spectroscope is moved into the color patch,
   causing, by the one or more processors, the spectroscope to execute measurement processing for a plurality of wavelengths set in advance while relatively moving the spectroscope in the one direction, and
   when at least one of amounts of variation of measured values with respect to each of the plurality of wavelengths obtained in the measurement processing exceeds a first threshold value and then each of the amounts of variation of the measured values of the plurality of wavelengths falls below a second threshold value which is less than or equal to the first threshold value, determining, by the one or more processors, that the measurement position measured by the spectroscope is moved into the color patch.

* * * * *